May 17, 1960  H. U. LIEBERHERR  2,936,575
SUPERCHARGED SPARK-FIRED GAS ENGINES
Filed June 7, 1956  2 Sheets-Sheet 2

Inventor
Hans U. Lieberherr
by Parker & Carter
Attorneys

United States Patent Office 2,936,575
Patented May 17, 1960

2,936,575
SUPERCHARGED SPARK-FIRED GAS ENGINES

Hans U. Lieberherr, Paris, France, assignor to Nordberg Manufacturing Company, Milwaukee, Wis., a corporation of Wisconsin Application June 7, 1956, Serial No. 589,890

16 Claims. (Cl. 60—13)

My invention is in the field of engines and is more specifically concerned with what I shall term a highly supercharged gas engine. By this I mean an engine which has a separate supercharging blower which will supply high pressure air to the cylinders for mixing with the fuel. As an example of what I mean by high pressure, I might state that a full load supercharging pressure after the supercharging blower of 2 atms. abs. or more should be considered.

A primary object of my invention is a gas fueled, spark-fired engine supercharged to a high pressure, for example 3 atms. abs. or more from the supercharging blower.

Another object is an engine of the above type provided with means for automatically maintaining an approximately constant air-fuel ratio in the cylinders.

Another object is an engine of the above type with means for automatically avoiding detonation or pre-ignition.

Another object is a super-charged gas engine in which the valve timing is varied to provide a larger entrapped volume in the cylinders at intermediate loads than at either full load or light load.

Another object is an engine of the above type constructed to provide an approximately constant air-fuel ratio for all loads, without throttling.

Another object is an engine of the above type in which the volume entrapped in the cylinder is varied to maintain a constant air-fuel ratio mixture for combustion.

Another object is an engine of the above type with scavenging.

Another object is an engine of the above type in which the effective expansion ratio is materially greater than the effective compression ratio at all loads.

Another object is an engine of the above type which operates at a substantially constant speed.

Another object is an engine of the above type with the inlet air intercooled to an approximately constant temperature regardless of load variations.

Other objects will appear from time to time in the ensuing specification and drawings in which.

At this point I should state that one of the objects of my invention is to operate a gas engine at the pressures normally associated with the diesel engine. This can be achieved by increasing the cycle pressures to similar values, avoiding simultaneously preignition or detonation of the combustive mixture. To do this, I intend to use a supercharger bearing a pressure ratio of 2 or more and to reduce the effective compression in the cylinders by either advancing or retarding the time of closing of the inlet valve. Or the exhaust valve could be manipulated. In any event, when using a high pressure ratio of 3 to 1 or more across the supercharger, with decreasing load, the supercharging pressure initially drops off at a faster rate than the load. Thereafter, for an intermediate portion of the load range, the supercharging pressure decreases at approximately the same rate as the load. At the lighter loads, the supercharging pressure decreases at a smaller rate than the load.

One of the fundamentals of successful gas engine operation is to maintain an approximately constant air-fuel ratio in the cylinders at all loads, and my invention is also concerned with this phase of engine operation.

Figure 1:
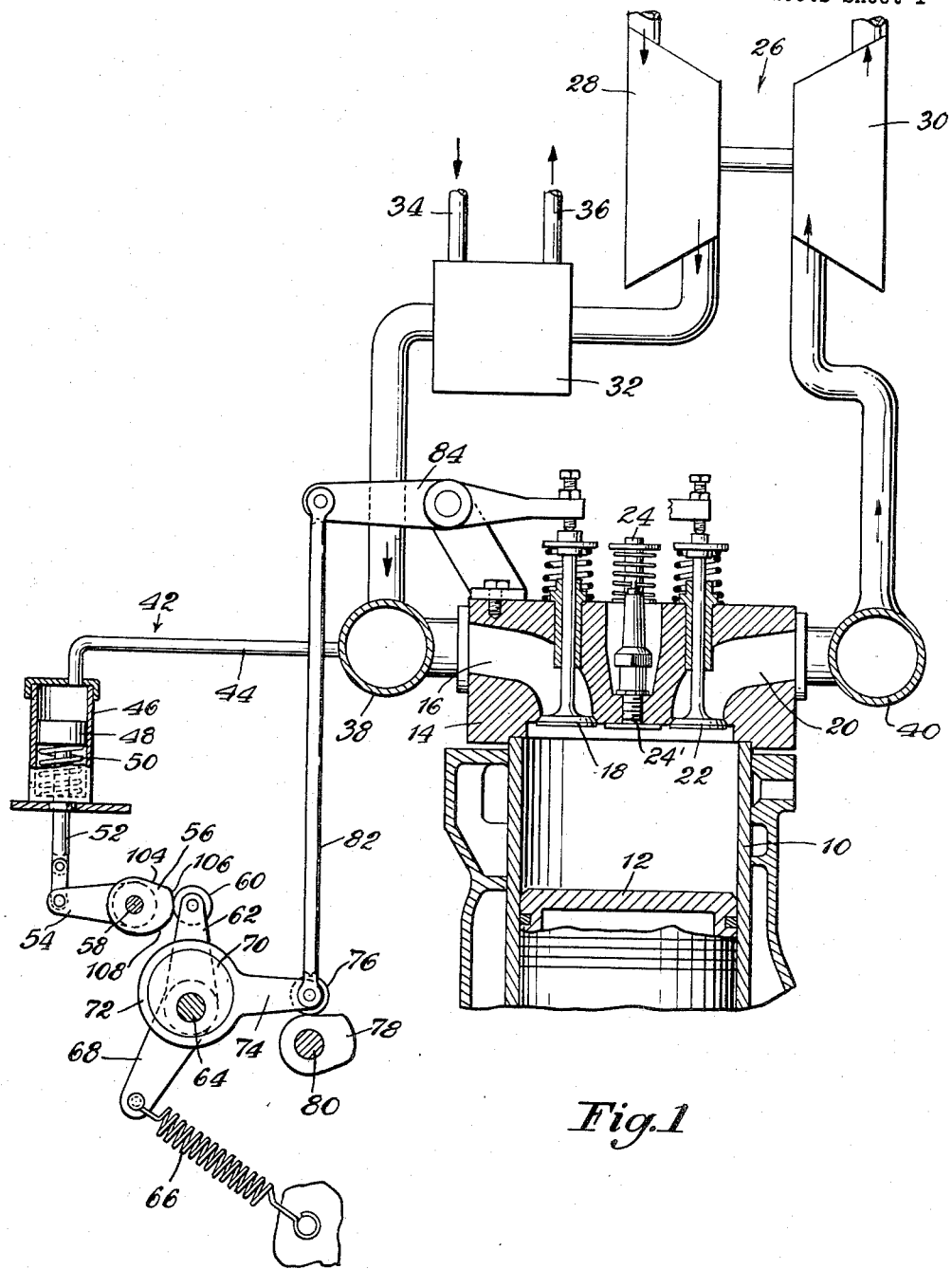
Figure 1 is a diagrammatic layout of my engine, partly in section.

In Figure 1 an engine cylinder is indicated generally at 10 with the usual piston 12 and cylinder head 14. The particular engine in Figure 1 will be recognized as a four-cycle engine with the usual inlet port 16, inlet valve 18, exhaust port 20, and exhaust valve 22 in the cylinder head. A gas valve of any suitable type is indicated generally at 24 with a suitable ignition device 24' shown in front of the gas valve in Figure 1. The valves may be closed by suitable springs and opened by rocker arms, push rods, and appropriate cams or by hydraulic means in the usual manner except as set forth hereinbelow.

An exhaust driven supercharger, indicated generally at 26, includes one or more blowers 28 of a suitable type coupled in any suitable manner to an exhaust gas turbine 30. The compressor or blower supplies air through a suitable duct to an intercooler 32 having an inlet 34 and outlet 36 for a suitable cooling medium, such as water. The highly compressed, cooled air is supplied by any suitable duct to an inlet manifold 38 and from there through the inlet ports, as controlled by the inlet valves, to the various cylinders. The products of combustion are exhausted through the exhaust ports 20 to a suitable exhaust manifold 40, if desired, or through any other suitable exhaust gas handling mechanism to one or more exhaust turbines.

I have shown only one cylinder and its related mechanism, but it will be understood that the invention is applicable to multicylinder engines with any number of cylinders with appropriate duplication of the various disclosed elements.

The inlet valve 18 is shown as controlled by an actuating mechanism 42 which includes a suitable pipe or conduit 44 connected to the inlet manifold so that the pressure variations of the inlet air will be reflected in an appropriate cylinder 46 to bias a suitable piston 48 against a spring 50, the cylinder below the piston being vented to prevent resistance to piston movement other than by the spring. A piston rod 52, extending from the piston, is connected to a suitable lever 54 to control the position of a cam 56 through a suitable shaft 58.

A roller follower 60, mounted on an appropriate lever 62, fixed on a shaft 64, is biased against the cam 56 by a suitable spring 66, or the like, through another lever 68 fixed on the shaft 64. The shaft 64 carries an eccentric 70 surrounded by a suitable strap 72 with an arm 74 carrying a follower 76 for the cam 78 on the camshaft 80. A push rod 82 extends from the follower to the usual rocker arm 84 which controls the inlet valve.

By this structure, the pressure of the inlet air controls the position of the cam 56 which, in turn, controls the position of the eccentric 70 because the follower 60 is biased against the cam 56 by the spring. The position of the eccentric determines the position of the follower 76 which, in turn, controls the time of both opening and closing of the inlet valve 18.

Figure 3:
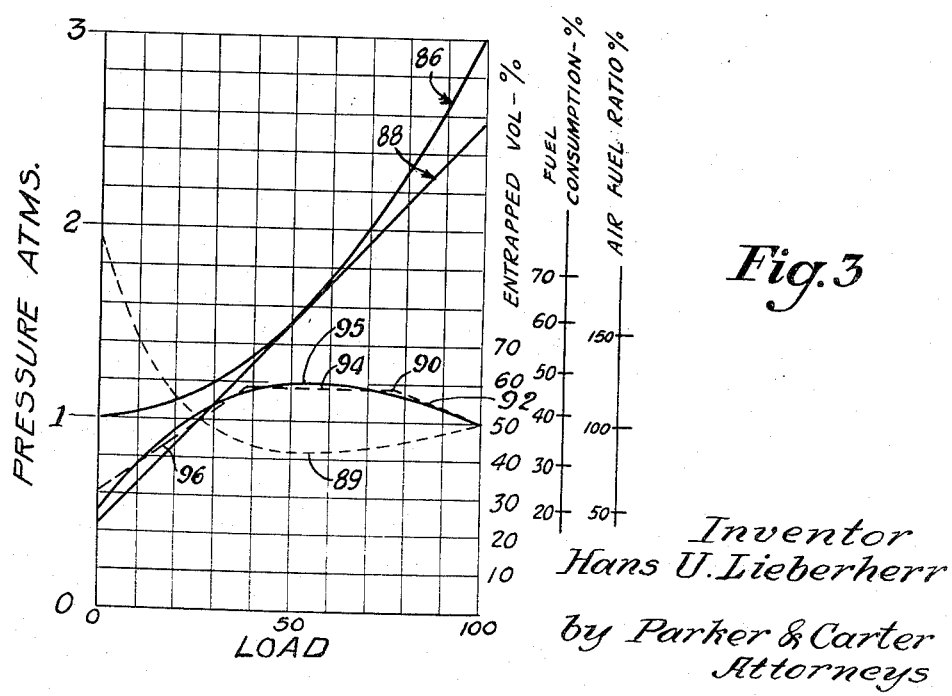
Figure 3 is a diagram of various engine characteristics plotted against load.

In Figure 3 the absolute supercharging pressure is indicated generally by the curve 86. The curve 88 indicates fuel consumption in lbs. per hour over the load, for a constant speed engine, and this curve will also represent the heat input for the engine. Comparing these two curves, it can be seen that the inlet pressure initially drops off from full load at a rate faster than the fuel consumption. This extends down to approximately 60% load. Thereafter down to approximately 50% load, or below, the curves closely coincide, or could be considered, for all practical purposes, substantially parallel. From approximately 50% load down to no load and idling, the curves separate and the rate of decrease of the inlet pressure is substantially reduced. This shows that under normal operation, the mixture in the cylinder would be too lean at the higher loads and too lean at the lower loads, due to an excess of air, assuming that the engine was set for proper operation at the intermediate loads. Thus, the air-fuel ratio would tend to follow the curve 89.

To correct this and to maintain the best cycle of efficiency and at the same time to produce proper ignition at all loads, I vary the volume of air entrapped so that the mixture resulting in the cylinder has an approximately constant air-fuel ratio at all loads.

In Figure 3, the curve 90 represents the theoretical volume of air entrapped at each load. Starting at full load, it will be noted that the volume initially increases along the line 92. During the intermediate loads, the volume entrapped remains approximately constant along the line 94. Thereafter, at the lighter loads, the volume decreases according to the line 96. It can therefore be seen that the maximum volume entrapped in the cylinder is at the line 94 and I set the valve timing to produce an effective compression ratio of approximately 6 to 1 at full load. This is the theoretical line whereas the actual curve is shown at 95.

Figure 2:
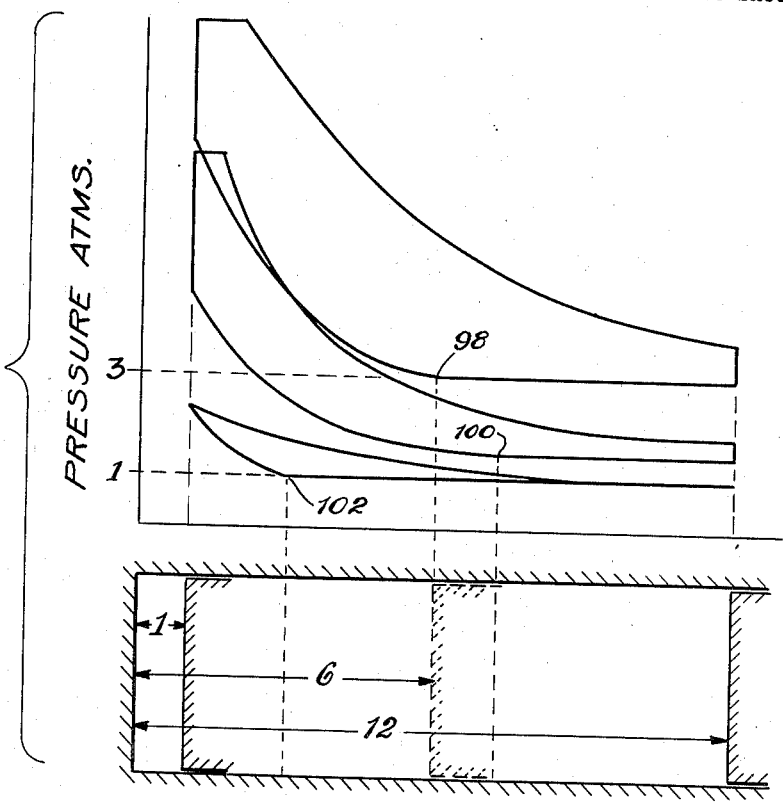
Figure 2 is a pressure volume diagram opposite a cylinder and piston position diagram.

In Figure 2 a pressure-volume diagram has been related to a piston position diagram with the largest P-V curve indicating full load. The inlet valve is controlled by the mechanism 42 to close at the point 98, either during the suction or compression stroke, as desired in relation to engine speed, so that the volume entrapped gives an effective compression ratio of approximately 6 to 1 as indicated on the piston position diagram.

The smaller P-V curve indicates approximately half load and the mechanism 42 controls the position of the cam follower to vary the time of closing, either retarded or advanced, depending upon whether the valve is closed during the suction stroke or held open and closed during the compression stroke, so that the effective compression ratio is increased to the closing position 100. Thereafter, at the lighter loads, the timing is varied by the mechanism 42 so that the P-V diagram at no load is indicated in Figure 2 with the time of closing at 102 to provide a quite small effective compression ratio. At no load, it will be seen that just sufficient air is entrapped to maintain ignition and combustion.

In a stationary engine, the position of the governor of the engine is a direct indication of load and may therefore be used for actuating a servo-mechanism for the valve timing. In this case, the control shaft for varying the gas quantity admitted may be connected directly to the control shaft 58 of Figure 1. In a stationary generating plant, even electrical control using the intensity of current supplied may be applied. In a marine plant, for instance for the use of gas engines in vessels built for transporting compressed or liquefied gases, the position of the hand lever at the control stand or the speed of the propeller shaft give a direct indication of the load of the engine. Consequently, they can be used for actuating the control shaft. Finally, factors dependent on load can be used, as shown on Figure 1, where the supercharging air pressure, dependent itself of speed and load of the engine, is applied to the servomotor.

In Figure 1, the cam 56 is designated so that the upper surface 104 controls the follower at the lighter loads, the outer surface 106, which may be concentric with the shaft 58, controls the follower at the intermediate loads, and the lower surface 108, giving larger variations for higher pressures, controls the follower at the higher loads.

The three pressure volume diagrams in Figure 2 are only representative or exemplary. In this particular case at full load, the blower provides 3 atms. or more of pressure and a compression ratio of approximately 6 to 1 with an expansion ratio of approximately 12 to 1, is provided in the cylinder. At half load, the supercharging pressure has decreased to about 1.6 atms. abs. To maintain the air-fuel ratio approximately constant at this lower inlet pressure, I increase the entrapped volume, so that even though the pressure of the air is falling off more rapidly than the load, nevertheless I increase the volume taken in, so that the resulting weight of air is proper for the fuel mixed with it. This increase in the entrapped volume corresponds to a compression ratio of about 7.2 to 1. At this point, it is important to notice that the effective compression ratio at part load is higher than at full load, but this does not mean that there is a greater danger of detonation, because the density of the mixture in the cylinder is lower. At no load or idling, the entrapped volume is decreased and is quite small. This gives very low compression pressures and a small indicated pressure, just sufficient to cover the engine losses.

The use, operation and function of my invention are as follows:

I have illustrated a four-cycle engine but the invention can be applied as well to two-cycle engines in the manner shown in my copending application Ser. No. 496,519, filed March 24, 1955.

I am specifically concerned with a gas engine which I want to operate at the pressures of the diesel cycle, or even higher. For example, assuming that I allow about 1000 p.s.i. maximum pressure, I then allow about 600 p.s.i. compression pressure. I must not exceed a volumetric compression ratio of approximately 6 to 1 at full load to avoid detonation, and this ratio corresponds to about 12 to 1 pressure ratio. This makes the initial compression pressure about 50 p.s.i. abs. From this I can allow a pressure ratio in the supercharger of approximately 3.53. It can thus be seen that, although I have stated approximately 3 atms. as my lower limit for inlet pressure, much higher pressures should be considered.

I also may control my combustion sufficiently to be able to run at a compression pressure of about 800 p.s.i. which, assuming a compression ratio of 6 to 1, will give me a supercharging pressure of the order of 66 p.s.i. abs. I can then have a pressure ratio in the supercharger of 4.63 to 1 approximately. If I raise the maximum pressure to 1500 p.s.i. and revise my figures accordingly, the supercharger ratio could be still higher. The compression ratio given is only an example and other ratios might be used according to the gas used.

In Figure 1, I have indicated a single stage compressor and it should be understood that I may use a multistage compressor for these high pressures, if desired. Similarly, on high pressure ratios, a multistage exhaust turbine may be substituted for the single stage turbine shown in Figure 1. For that matter, the compressor 28 may be considered as either a single or multiple stage unit.

In any event, the supercharger will operate to give an absolute charging pressure which falls off initially at a faster rate than the load, falls off thereafter approximately parallel to the load in the intermediate loads, and thirdly, falls off at a slower rate to no load. To maintain best cycle efficiency and to insure ignition at all loads from full load down, I initially increase the volume of air entrapped for compression by suitable variation in the valve timing when the inlet air pressure is falling at a faster rate than the load. Thereafter I maintain the timing constant and therefore the volume of air entrapped remains constant during the second period when the inlet air pressure is falling at approximately the same rate as the load. Thereafter I decrease the volume entrapped for compression by suitable valve timing during that period at the lighter loads when the inlet air is falling at a slower rate than the load.

In all cases, the effective compression ratio is substantially less than the effective expansion ratio. For example, the expansion ratio can be 10 to 1 at full load or even 12 to 1, if desired.

Suitable valve overlap at top dead center may be provided for scavenging.

It will be realized that whereas I have described and illustrated a practical and operative device, nevertheless, many changes may be made in the size, shape, arrangement, number and disposition of parts without departing materially from the spirit of my invention. I wish, therefore, that my showing be taken as in a large sense illustrative or diagrammatic rather than as limiting me to my precise illustration.

I claim:

1. In a spark-fired gas engine, having a cylinder, a valve therein for supplying gaseous fuel to the cylinder, means for igniting the cylinder contents, an exhaust driven supercharger connected to supply air to the cylinder at a pressure, at full load, of 2 atmospheres absolute or more, the supercharger being constructed so that as the load decreases, the pressure of the inlet air falls off at least initially, at a faster rate than the load, an intercooler for reducing the temperature of the air to an approximately constant value for all loads before it is admitted to the cylinder, means actuating the valves of the engine providing an effective volumetric compression ratio insuring safe operation without detonation and preignition at full load, and means varying the actuation of the valves only to maintain an approximately constant air-fuel ratio mixture in the cylinder at all loads, including means actuating the valves as the load decreases from full load increasing the volume of air entrapped for compression.

2. The structure of claim 1 in which said valve actuating means includes a mechanism timing the valves to give an expansion volume ratio of approximately twice the full load compression volume ratio.

3. The structure of claim 1 characterized by the engine having an expansion volume ratio of 10 to 1 or more.

4. The structure of claim 1 in which the engine is a constant speed engine, and said last mentioned means includes a device which increases the entrapped volume from full load down to approximately 60% load, then holds the entrapped volume approximately constant down to 50% load, and then decreases the entrapped volume down to no load, and vice versa, all by valve actuation.

5. The structure of claim 1 in which the supercharger has more than one compression stage.

6. A gas fueled, spark-fired engine including an exhaust driven supercharger which compresses the inlet air to a pressure of approximately 2 atmospheres absolute, or more, an intercooler which cools the compressed air to a predetermined temperature after it is compressed, means reducing the temperature rise due alone to compression in the cylinder including means reducing the effective compression ratio to a maximum compatible with absence of preignition and detonation at full load, and means maintaining the air-fuel ratio of the entrapped mixture approximately constant as the load falls, without throttling, including means increasing the volume of air entrapped from full load down to a selected part load, means maintaining the entrapped volume approximately constant from said selected part load down to a second selected part load, and means decreasing the entrapped volume from said second selected part load down to no load.

7. In a spark-fired, gas fueled engine, a cylinder and piston, means for supplying a gaseous fuel to the cylinder, means for igniting the cylinder contents, a supercharger driven by the exhaust gases and connected to supply air to the cylinder at a pressure that falls, as the load decreases from full load to no load, initially, at a faster rate than the load, secondly at approximately the same rate as the load, and thirdly at a slower rate than the load, the supercharger being connected to supply inlet air at 3 atmospheres of pressure or more at full load, an intercooler between the supercharger and cylinder that reduces the temperature of the inlet air from the supercharger before it is admitted to the cylinders, a valve mechanism that controls the admission of fresh air and the exhaustion of burnt gases to and from the cylinder, and valve actuating means actuating at least a part of the valve mechanism so that an approximately constant air-fuel ratio mixture will result in the cylinder due only to the actuation of said part of the valve mechanism, including means actuating said part of the valve mechanism as the load decreases from full load, increasing the volume of air entrapped for compression during the initial period when the inlet air pressure is falling at a faster rate than the load, means maintaining the volume of air entrapped for compression approximately constant during the second period when the inlet air pressure is falling at approximately the same rate as the load, and means decreasing the volume of air entrapped for compression during the third period when the inlet air is falling at a slower rate than the load.

8. The structure of claim 7 in which the valve actuating means is constructed so that, during the second period when the inlet air is falling at approximately the same rate as the load, the effective compression ratio is at a maximum compatible with absence of preignition and detonation at full load.

9. The structure of claim 7 in which the engine is a four stroke cycle engine with the said valve mechanism including an inlet and an exhaust valve for the cylinder, the said part of the valve mechanism being the inlet valve.

10. The structure of claim 7 in which the compression ratio in the cylinder, due to actuation of the said part of the valve mechanism by the valve actuating means, is greater during the said second period, when the pressure of the inlet air is falling at approximately the same rate as the load, than it is at either higher or lower loads.

11. The structure of claim 7 in which said means for actuating said part of the valve mechanism is constructed and arranged to retard the time of closing of said part of the valve mechanism during the initial period, to hold its time of closing approximately constant during the second period, and to advance its time of closing during the third period.

12. The structure of claim 7 in which the valve actuating means is constructed to provide an effective expansion ratio of at least 10 to 1 at full load.

13. The structure of claim 7 in which the valve actuating means is controlled by a factor determining load or dependent on load.

14. In a spark-fired, gas fueled engine, a cylinder and piston, means that supplies a gaseous fuel to the cylinder, means that ignites the cylinder contents, a supercharger driven by the exhaust gases and connected to the engine to supply air to the cylinder at a pressure that falls, as the load decreases from full load to no load, initially at a faster rate than the load, and later at a slower rate than the load, the supercharger being constructed to supply air at least at two atmospheres of pressure or more at full load, an intercooler connected between the supercharger and engine that reduces the temperature of the inlet air before it is admitted to the cylinder, a valve mechanism that controls the admission of air and the exhaustion of burnt gases from the cylinder, and valve actuating means actuating at least a part of the valve mechanism so that an approximately constant air-fuel ratio mixture will result in the cylinder due to the actuation of said part of the valve mechanism, said means having means actuating said part of the valve mechanism as the load decreases from full load to increase the volume of air entrapped for compression during the initial period when the inlet air pressure is falling at a rate faster than the load, and means decreasing the volume of air entrapped for compression during the later period when the inlet air pressure is falling at a slower rate than the load.

15. In a spark-fired, gas-fueled engine, a cylinder and piston, means that supplies a gaseous fuel to the cylinder, means that ignites the cylinder contents, a supercharger driven by the exhaust gases and connected to the engine to supply air to the cylinder at a pressure that falls, as the load decreases from full load to no load, during one portion of the load range at approximately the same rate as the load and during a lower portion of the load range at a slower rate than the load, the supercharger being constructed to supply air at least at two atmospheres of pressures or more at full load, an intercooler connected between the supercharger and the engine that reduces the temperature of the inlet air before it is admitted to the cylinder, a valve mechanism that controls the admission of air and the exhaustion of burnt gases from the cylinder, and valve actuating means actuating at least a part of the valve mechanism so that an approximately constant air-fuel ratio mixture will result in the cylinder due to the actuation of said part of the valve mechanism, said valve actuating means having means actuating said part of the valve mechanism as the load decreases through the one portion of the load range to maintain the volume of air entrapped for compression approximately constant when the inlet air pressure is falling at approximately the same rate as the load, and means decreasing the volume of air entrapped for compression during the second portion of the load range when the inlet air pressure is falling at a slower rate than the load.

16. In a spark-fired, gas-fueled engine, a cylinder and piston, means that supplies a gaseous fuel to the cylinder, means that ignites the cylinder contents, a supercharger driven by the exhaust gases and connected to the engine to supply air to the cylinder at a pressure that falls, as the load decreases from full load to no load, initially at a faster rate than the load, and later at approximately the same rate as the load, the supercharger being constructed to supply air at least at two atmospheres of pressure or more at full load, an intercooler connected between the supercharger and engine to reduce the temperature of the inlet air before it is admitted to the cylinder, a valve mechanism that controls the admission of air and the exhaustion of burnt gases from the cylinder, and valve actuating means actuating at least a part of the valve mechanism so that an approximately constant air-fuel ratio mixture will result in the cylinder due to the actuation of said part of the valve mechanism, said valve actuating means having means actuating said part of the valve mechanism as the load decreases from full load to increase the volume of air entrapped for compression during the initial period when the inlet air pressure is falling at a faster rate than the load, and means for holding the volume of air entrapped for compression approximately constant during the later period when the inlet air pressure is falling at approximately the same rate as the load.

References Cited in the file of this patent

UNITED STATES PATENTS

| Number | Name | Date |
|---|---|---|
| 1,371,444 | Sherbondy | Mar. 15, 1921 |
| 2,097,883 | Johansson | Nov. 2, 1937 |
| 2,401,188 | Prince | May 28, 1946 |
| 2,489,068 | Carlson | Nov. 22, 1949 |
| 2,581,669 | Kadenacy | Jan. 8, 1952 |
| 2,773,490 | Miller | Dec. 11, 1956 |